May 27, 1930.  H. A. MYERS  1,759,953
CONFECTION MUSICAL TOY
Filed June 21, 1928
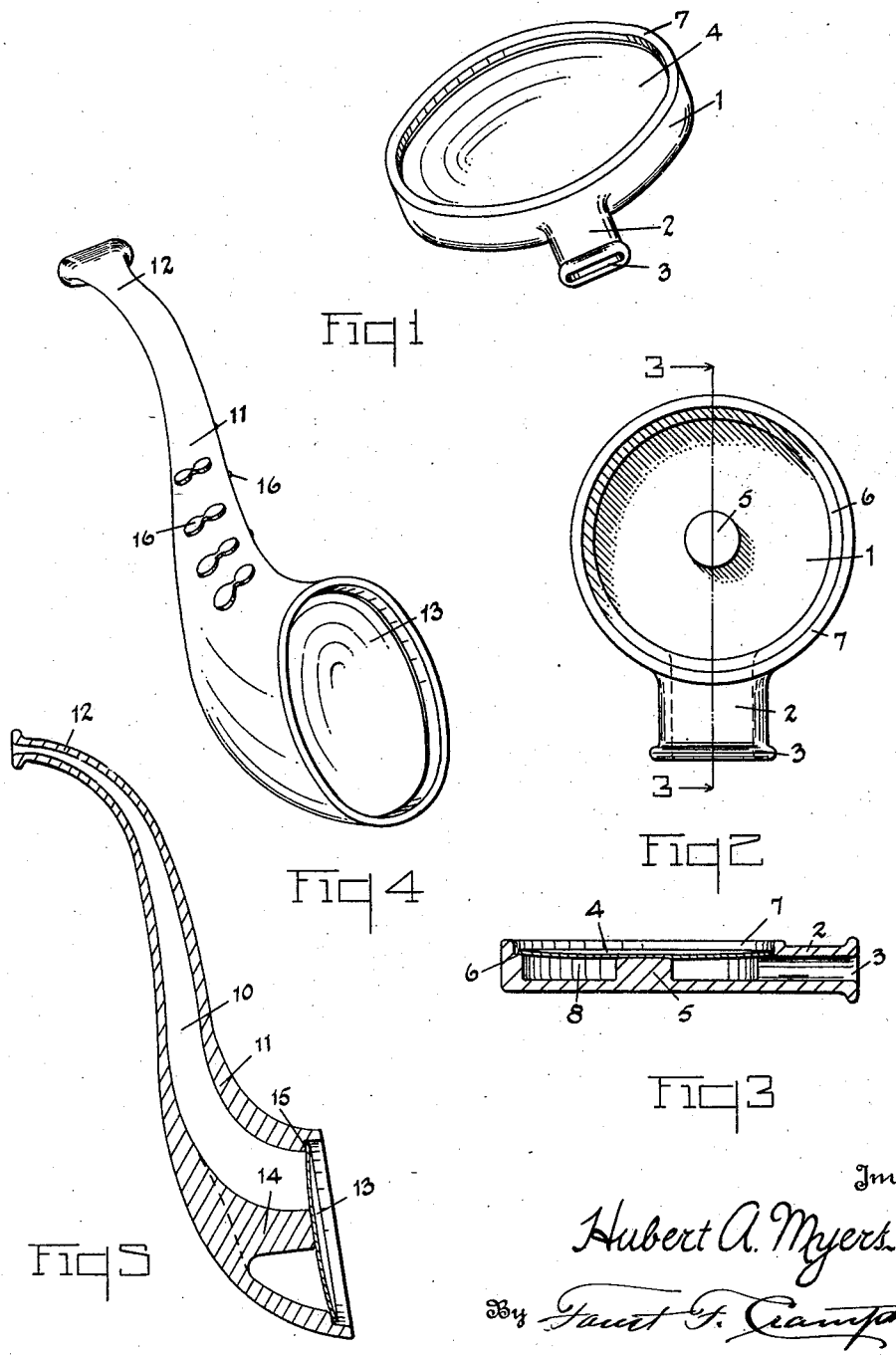

Patented May 27, 1930

1,759,953

UNITED STATES PATENT OFFICE

HUBERT A. MYERS, OF TOLEDO, OHIO, ASSIGNOR OF ONE-HALF TO ARTHUR S. HICKOK, OF TOLEDO, OHIO

CONFECTION MUSICAL TOY

Application filed June 21, 1928. Serial No. 287,221.

My invention has for its object to provide a toy that may be formed of candy or gum or other confection material and which is so formed that modulated voice vibrations may be produced thereby so as to give the typical effect of a "kazoo". The toy is, moreover, so formed as to present a unique and striking appearance. Thus, the invention provides a combination of features that makes it highly attractive to children and that gives it a high sale value.

The invention may be contained in toys of different forms and, to illustrate a practical application of the invention, I have selected two structures embodying my invention and shall describe them hereinafter. The structures selected, as examples of the various forms of structure that contain the invention, are shown in the accompanying drawings.

Fig. 1 illustrates a perspective view of one form of construction. Fig. 2 is a top view of the toy illustrated in Fig. 1, the diaphragm being shown as removed. Fig. 3 is a view of a section taken on the plane of the line 3—3 indicated in Fig. 2, the diaphragm, however, being shown in Fig. 3. Fig. 4 is a perspective view of a modified form of construction. Fig. 5 is a view of a section of the device illustrated in Fig. 4.

The toys embodying my invention are preferably so formed that they may be molded from a plastic material and, particularly, they are so formed that they may be molded from gum, such as paraffin gum, or candy, preferably hard, transparent candy. They are also so formed as to locate a diaphragm, which is secured centrally or peripherally, in contact with a part of the instrument either peripherally or centrally so that sound vibrations transmitted to the diaphragm will be dampened when the diaphragm moves in one direction in order to produce the somewhat instrumental sound characteristic of the "kazoo". In the forms of construction shown in the drawing, an air column is formed within the body of the instrument through which the voice vibrations of sound will be projected against the diaphragm in each case and, the diaphragm being secured centrally and its peripheral portion resting in contact with a suitable flange or shoulder, there will be produced the desired modulations or characteristic sound.

In the form of construction shown in Fig. 1, the body 1 of the instrument is made in the form of a shallow dish and is provided with a relatively large mouthpiece 2. The mouthpiece 2 has a thickness sufficient to give it ample strength for supporting the body portion 1 of the instrument between the lips of the user, or the lips and the teeth of the user. Thus, where the instrument is formed of paraffin gum, the wall of the mouthpiece 2 is made considerably larger and thicker than when made of candy. Preferably, the mouthpiece 2 is formed in the shape of a flattened tube, oblong in cross section, substantially as shown in the drawings and is, moreover, provided with a large lip 3 for the purpose of strengthening the edge of the mouthpiece.

The diaphragm 4 is secured by any suitable means to a central post or boss 5 that protrudes from the bottom of the dish-shaped instrument. The diaphragm may be secured centrally by reason of the adhesive characteristic of confections. If desired, candy shellac may be used for securing the central part of the diaphragm to the post or boss 5, or the post may extend through the diaphragm and be headed over to centrally secure the diaphragm. The periphery of the diaphragm rests upon a shoulder 6 preferably located below the edge 7 of the dish-shaped instrument. The height of the boss 5 with reference to the height of the shoulder is such that the central part of the diaphragm 4 will be drawn down when it is secured to the boss 5, thus producing a concave shape. The diaphragm 4 is formed of any elastic sheet material, such as thin cardboard or other suitable material, and when it is depressed centrally, as when it is secured to the boss 5, the peripheral edge portion of the disc will be elastically pressed against the shoulder 6. When, therefore, voice vibrations are transmitted through the mouthpiece 2 and through the chamber 8 formed within the body portion of the intrument, to the diaphragm, the vibrations set up in the diaphragm are limited and modified by the elastic pressure to which its peripheral portion is subjected and, hence, the characteristic semi-musical sounds will be created in a manner that is exceedingly attractive to children.

In the form of construction shown in Figs. 4 and 5, the toy is so formed as to present the appearance of a horn or what might be termed an abbreviated saxophone. The invention particularly resides in so forming the structure as to present the horn shape and yet produce the sound effects characteristic of the "kazoo", when formed of a molded plastic, such as confection. The invention in the form of construction shown in Figs. 4 and 5, resides in the shape of the body portion, whereby the sound produced by the voice will be transmitted to the diaphragm in order to set up the voice vibrations in the diaphragm. The chamber 10 formed within the body portion 11 of the instrument uniformly tapers from the mouthpiece 12 to a point back of the diaphragm 13. The chamber 10 thus progressively increases in cross sectional area, as it progresses from the mouthpiece 12, whereby the diaphragm 13 may be vibrated by the voice, notwithstanding the long distance between the diaphragm 13 and the mouthpiece 12. The post 14 rises from the back of the instrument to conform to the progressively increasing cross sectional area of the chamber 10 and is connected to the central part of the diaphragm 13. The body of the instrument is provided with a shoulder 15 and the post 14 is so located with respect to the shoulder 15 that, when the diaphragm 13 is secured to the post 14, the edge of the diaphragm 13 will rest against the shoulder 15. Preferably, when the diaphragm 13 is secured to the post 14, it is drawn centrally below the shoulder 15, whereby the elasticity of the diaphragm 13 will cause the peripheral portion of the diaphragm 13 to be elastically pressed against the shoulder 15. When, therefore, the voice sounds are produced at the mouthpiece 12 the air in the chamber 10, which is tapered in form, will transmit the voice vibrations set up therein to the diaphragm 13, which, however, is limited in its accuracy of response to the voice vibrations by reason of its contact with the shoulder 15, with the result that the characteristic kazoo sounds will be produced.

If desired, suitable knobs or metallic parts 16 may be formed integral with the body portion of the instrument or may be embedded therein and so shaped and located as to suggest the keys commonly used in saxophones and other horn instruments. Also, since the diaphragm extends over a considerable area and is exposed, suitable printing or decorative material may be produced thereon.

Thus, by my invention I have provided an exceedingly attractive toy which has many attributes that appeal to children and make it a very desirable toy.

I claim:

1. In a toy, a diaphragm of elastic sheet material forming a closed chamber within the body of the toy, a post projecting into the chamber, the upper end of the post located below the level of the edge of the body of the toy, the diaphragm secured to the post to elastically press the diaphragm against an edge portion of the body of the toy.

2. In a toy, a diaphragm of elastic sheet material forming a closed chamber within the body of the toy, a post projecting into the chamber, the upper end of the post located below the level of the edge of the body of the toy, the diaphragm secured to the post to elastically press the diaphragm against an edge portion of the body of the toy, a chamber formed with increasing cross-sectional area progressively from the mouthpiece to the diaphragm.

3. In a sound producing toy, the body of the toy having a chamber, a diaphragm forming one wall of the chamber and completely closing the chamber, the diaphragm formed to have a concave exterior surface, the edge of the diaphragm being located at all of its points in contact with an edge of the body of the toy, and a mouthpiece communicating with said chamber.

In witness whereof I have hereunto signed my name to this specification.

HUBERT A. MYERS.